(12) United States Patent
Gartner

(10) Patent No.: US 7,922,261 B2  
(45) Date of Patent: Apr. 12, 2011

(54) CAST WHEEL

(75) Inventor: Josef Gartner, Mining (AT)

(73) Assignee: Austria ALU-GUSS-Gesellschaft M.B.H., Braunau am Inn-Ranshofen (AT)

( * ) Notice: Subject to any disclaimer, the term of this patent is extended or adjusted under 35 U.S.C. 154(b) by 0 days.

(21) Appl. No.: 12/039,295

(22) Filed: Feb. 28, 2008

(65) Prior Publication Data

US 2008/0211292 A1  Sep. 4, 2008

(30) Foreign Application Priority Data

Mar. 1, 2007  (AT) .................................. 126/2007 U

(51) Int. Cl.  
*B60B 25/00* (2006.01)

(52) U.S. Cl. ............................ 301/95.107; 301/95.101

(58) Field of Classification Search ............. 301/63.101, 301/63.103, 63.106, 63.109, 64.101, 64.102, 301/65–66, 95.101, 95.108–95.109; 29/894.35, 29/894.353  
See application file for complete search history.

(56) References Cited

U.S. PATENT DOCUMENTS

| | | | |
|---|---|---|---|
| 1,974,534 A | | 9/1934 | Frank |
| 4,165,131 A | | 8/1979 | Thompson |
| 5,292,182 A | * | 3/1994 | Kanazawa et al. ............... 301/65 |
| 5,548,896 A | | 8/1996 | Archibald |
| 5,632,529 A | * | 5/1997 | Wei ........................ 301/95.102 |
| 5,794,340 A | * | 8/1998 | Pollkotter ................ 29/894.324 |
| 5,826,949 A | | 10/1998 | Bortoloni |
| 5,899,538 A | * | 5/1999 | Tatraux-Paro et al. .......... 301/65 |
| 6,318,446 B1 | | 11/2001 | Nichols et al. |
| 2008/0277996 A1 | * | 11/2008 | Ono ............................... 301/62 |

FOREIGN PATENT DOCUMENTS

| | | |
|---|---|---|
| GB | 841 469 | 7/1960 |
| GB | 2 249 063 | 4/1992 |

* cited by examiner

*Primary Examiner* — Jason R Bellinger  
(74) *Attorney, Agent, or Firm* — Greenblum & Bernstein, P.L.C.

(57) ABSTRACT

The invention relates to a cast wheel having a wheel rim base, a rear edge region, and a front edge region, wherein the front edge region is coupled to the rear edge region via the wheel rim base. The cast wheel includes at least one reduced-material portion structured and arranged in the rear edge region and a circumferential bead arranged in a rearward portion of the rear edge region, wherein at least a part of the reduced-material portion is located in a region of the circumferential bead and is structured and arranged to widen radially inward from a radially outwardly located vertex region towards a leveling-off end.

23 Claims, 5 Drawing Sheets

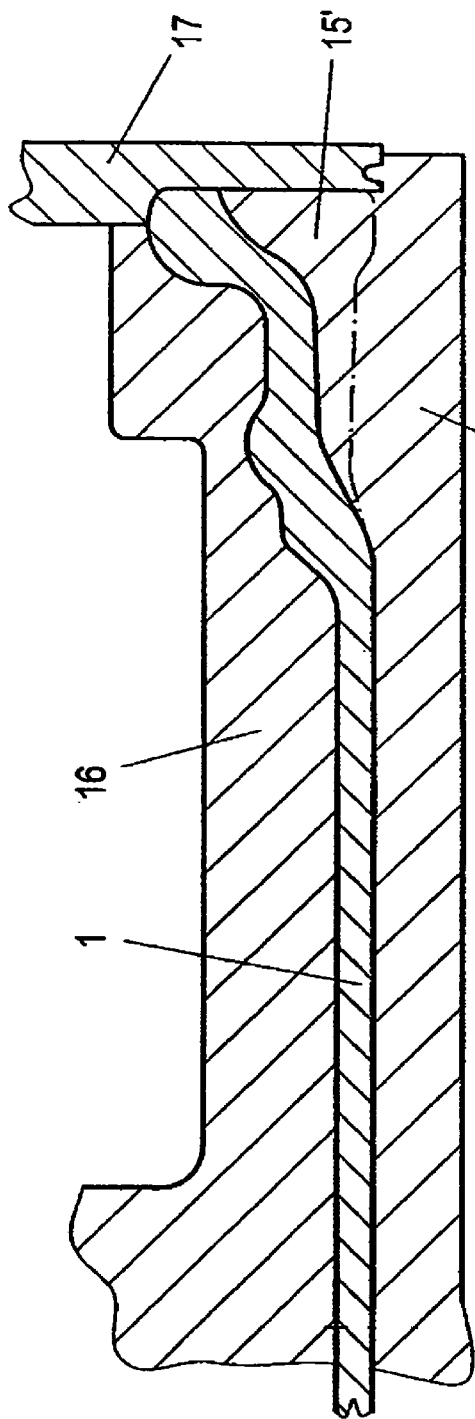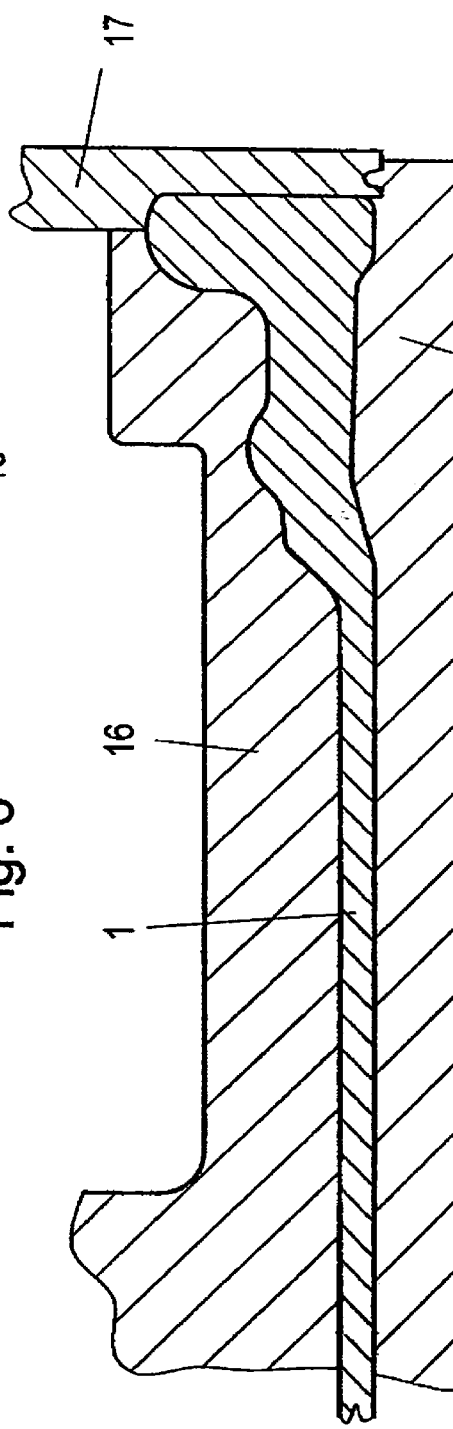

CAST WHEEL

CROSS-REFERENCE TO RELATED APPLICATIONS

The present application claims priority under 35 U.S.C. §119 of Austrian Utility Model Application No. GM 126/2007, filed on Mar. 1, 2007, the disclosure of which is expressly incorporated by reference herein in its entirety.

BACKGROUND OF THE INVENTION

1. Field of the Invention

The invention relates to a cast wheel and, in particular, to a cast wheel having at least one reduced-material portion.

More specifically, the invention includes a cast wheel, which comprises a front edge region following on a wheel rim body. The front edge region is connected to an oppositely located rear edge region via a wheel rim base. The rear edge region has at least one reduced-material portion so that the wall thickness of the cast wheel tapers in the region of the reduced-material portion relative to a peripherally adjacent region. The reduced-material portion is at least partially located in the rear edge region that forms a rearwardly arranged circumferential bead.

The invention further relates to a casting mold for producing a cast wheel with a front edge region following a wheel rim body. The front edge region is connected to an oppositely located rear end region via a wheel rim base. The casting mold comprises at least one elevation of material in the rear edge region, so that the wall thickness of the cast wheel tapers in the region of the elevation of material of the casting mold relative to a peripherally adjacent region.

2. Discussion of Background Information

In order to produce cast wheels with as little mass as possible, designers have aimed to create cast wheels with walls as thin as possible in the front and rear edge regions of the cast wheel.

An aluminum cast wheel is known from U.S. Pat. No. 6,318,466, which has reduced-material portions in the front edge region of the cast wheel for purposes of reducing the weight of the cast wheel. These reduced-material portions may peripherally extend the circumferential channel in the circumferential front bead or peripherally distributed recesses.

According to guidelines generally devised in the automobile industry, it is now required for cast wheels to withstand higher impact stresses. As a result, the rear edge region must be made with a wall thickness that is markedly higher than the wheel rim base, which disadvantageously increases the mass of the cast wheel.

It has basically been known from GB 2 249 063 to provide extending channels, which are substantially circumferential, in the rear edge region located opposite the front edge region. By using these closed, channel-like indentations, the risk of air inclusions formed when casting the cast wheel is reduced. However, these channel-shaped indentations disadvantageously weaken the cast wheel in its rear edge region.

SUMMARY OF THE INVENTION

An aspect of the present invention provides a cast wheel, which will meet the increased requirements in terms of impact strength while having comparatively little mass.

According to the invention, the cast wheel has an initially defined type. This initially defined type has part of its reduced-material portion, which is located in the rear peripheral bead of the rear edge region, widen radially inwardly from a radially outwardly located vertex region towards a leveling-off end. This reduces the weight of the cast wheel while optimizing the force absorption of the cast wheel in case of a highly dynamic impacting stress. By providing reduced-material portions that widen radially inwardly, i.e., have extensions that increase in a peripheral direction towards the center of the wheel, the cast wheel is less stiff in the rear edge region, which results in a higher energy absorption capacity and, thus, an improved adaptation, in particular to a highly dynamic impact stress. For obtaining this improved energy absorption capacity, it is particularly advantageous if a plurality of uniformly peripherally distributed reduced-material portions are provided. In this case, it is suitable if all of the reduced-material portions are of equal configuration.

It is advantageous if the reduced-material portions are provided on an inner side of the cast wheel that faces away from the side that receives a tire so as not to impair the connection between the cast wheel and a tire that is to be fastened to the cast wheel.

Tests have shown that it is particularly advantageous if the reduced-material portions at least partially have a longitudinal extension direction that is substantially parallel to the plane of the wheel rim base extension. Additionally, or as an alternative, it is advantageous if the direction of the reduced-material portions at least partially have a longitudinal extension that is substantially parallel to a part of the rear edge region's plane of extension, which forms a rear circumferentially extending bead. Accordingly, it is particularly advantageous if the pocket-like reduced-material portions are substantially L-shaped, when viewed in cross-section. In order to optimize the energy absorption capacity of the cast wheel, it is advantageous if the depth of the reduced-material portions increase towards the rear end of the rear edge region.

Likewise, for obtaining the aspects of the invention, it is suitable for the depth of the reduced-material portion to increase slightly, starting from a region following the wheel rim base. Additionally, it is suitable for a substantially step-shaped depression of the reduced-material portion to be provided in the region where the rear edge forms a circumferentially extending bead. In this case, it is advantageous if the depth of the reduced-material portion in the slightly increasing region increases substantially linearly, in particular by approximately 5°. In order to optimize the weight saved, it is suitable if the cast wheel is concavely curved in the region of the reduced-material portions in the rear, circumferentially extending bead of the rear edge region, wherein the concavely curved portion advantageously is substantially circular-arc-shaped when viewed in cross-section, and preferably has a radius of between 20 and 30 mm.

Furthermore, with a view to an increased energy absorption capacity of the cast wheel it has proven suitable if the vertex region is circular-arc-shaped, in particular having a radius of between 10 and 20 mm, wherein, advantageously, the reduced-material portions widen substantially linearly following upon the circular-arc-shaped vertex region. In particular, it has proven to be suitable if the straight-line parts of the reduced-material portions enclose an angle of between 70° and 80°, preferably of substantially 75°.

The casting mold of the initially defined kind is suitable for producing a cast wheel according to the invention. By providing a casting mold including at least one elevation of material in the rear edge region of the cast wheel to be produced, the previously mentioned advantages of a higher energy absorption capacity of the cast wheel to be produced as well as of the lighter construction of the cast wheel can be achieved so that as regards the advantages of the casting mold according to the invention, reference is made to the previous statements.

An aspect of the invention includes a cast wheel having a wheel rim base, a rear edge region, and a front edge region, wherein the front edge region is coupled to the rear edge region via the wheel rim base. The invention further includes at least one reduced-material portion structured and arranged in the rear edge region and a circumferential bead arranged in a rearward portion of the rear edge region, wherein at least a part of the reduced-material portion is located in a region of the circumferential bead and is structured and arranged to widen radially inward from a radially outwardly located vertex region towards a leveling-off end.

The invention may further include a wall thickness of the cast wheel, which is structured to taper in a region of the at least one reduced-material portion relative to a peripherally adjacent portion. The at least one reduced-material portion is uniformly peripherally distributed.

The cast wheel of the present invention may include at least one reduced-material portion having equal configurations. The at least one reduced-material portion is arranged on an inner side of the cast wheel, which faces away from a side for receiving a tire. The at least one reduced-material portion can further include an extension that is substantially parallel to a plane of extension of the wheel rim base. Additionally, the at least one reduced material portion can include an extension that is substantially parallel to a plane of extension of the rear edge region that forms the circumferential bead. The at least one reduced material portion can increase by approximately 5°. The cast wheel may further include a substantially step-shaped depression of the at least one reduced-material portion in the region that forms the circumferential bead.

The at least one reduced material portion is substantially L-shaped in cross-section. Additionally, the at least one reduced material portion includes a depth that increases towards a rear end of the rear edge region. The depth of the at least one reduced material portion can increase slightly starting from a region following the wheel rim base. The depth of the at least one reduced material portion can increase substantially linearly.

The cast wheel of the present invention can be concavely curved in the circumferential bead region. The concavely curved portion is substantially circular-arc-shaped in cross-section. Additionally, the concavely curved portion can have a radius between 20 and 30 mm.

The cast wheel includes a vertex region, which is circular-arc-shaped and has a radius between 10 and 20 mm. The at least one reduced-material portion widens substantially along a straight line in the circular-arc-shaped vertex region. The at least one reduced-material portion widens to enclose an angle between 70° and 80° along the straight line in the circular-arc-shaped vertex region, and can be substantially 75°.

A casting mold for producing a cast wheel includes at least one elevation of material in a rear edge region of the cast wheel, wherein a wall thickness of the cast wheel tapers into the at least one elevation of material relative to a peripherally adjacent region.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6 shows a sectional representation of a casting mold in the region of a material elevation for forming the reduced-material portion in the cast wheel;
and
FIG. 7 shows a section through the casting mold in a region without material elevations.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
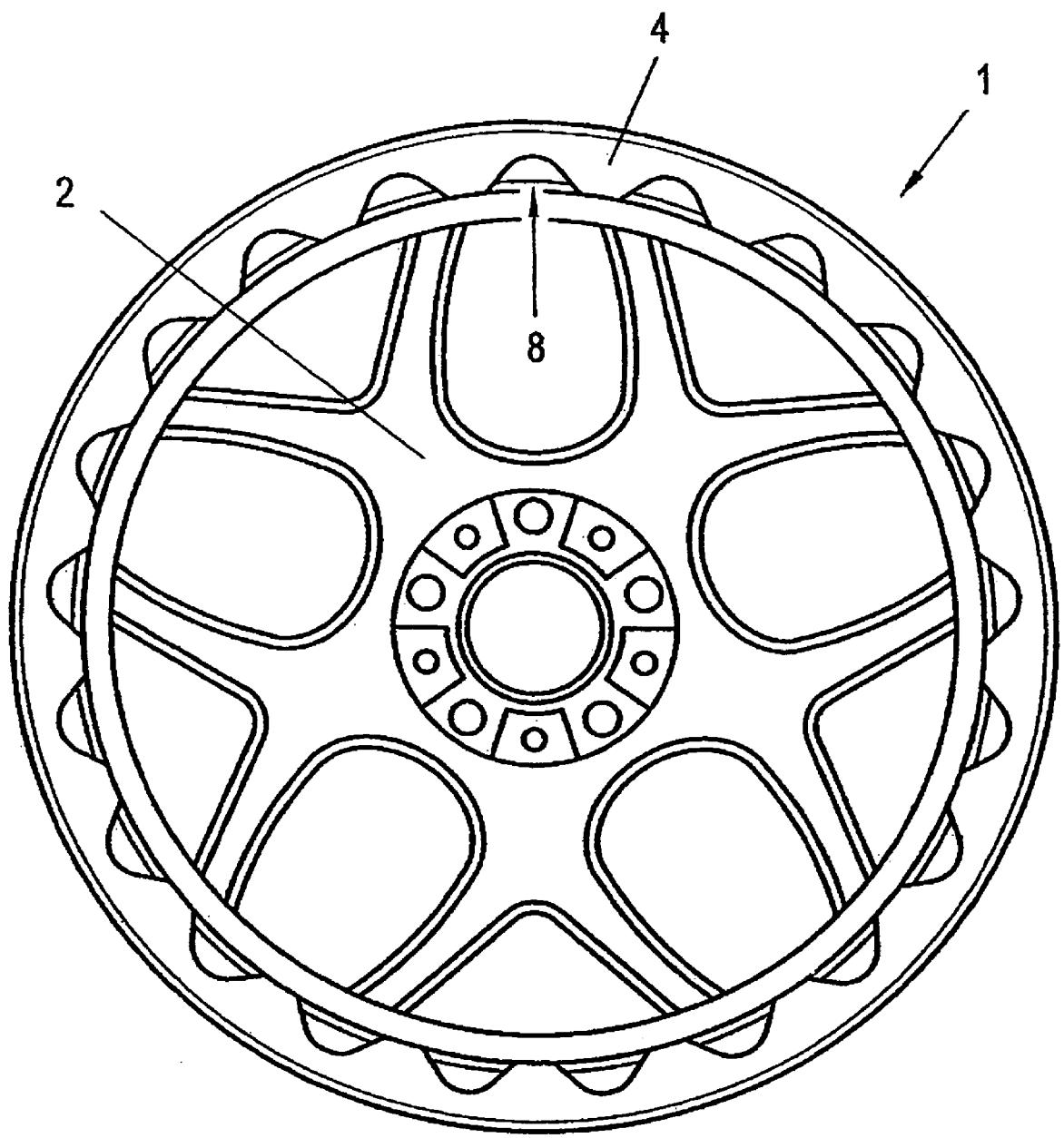
FIG. 1 shows a view of a rear edge region of a cast wheel.
Figure 2:
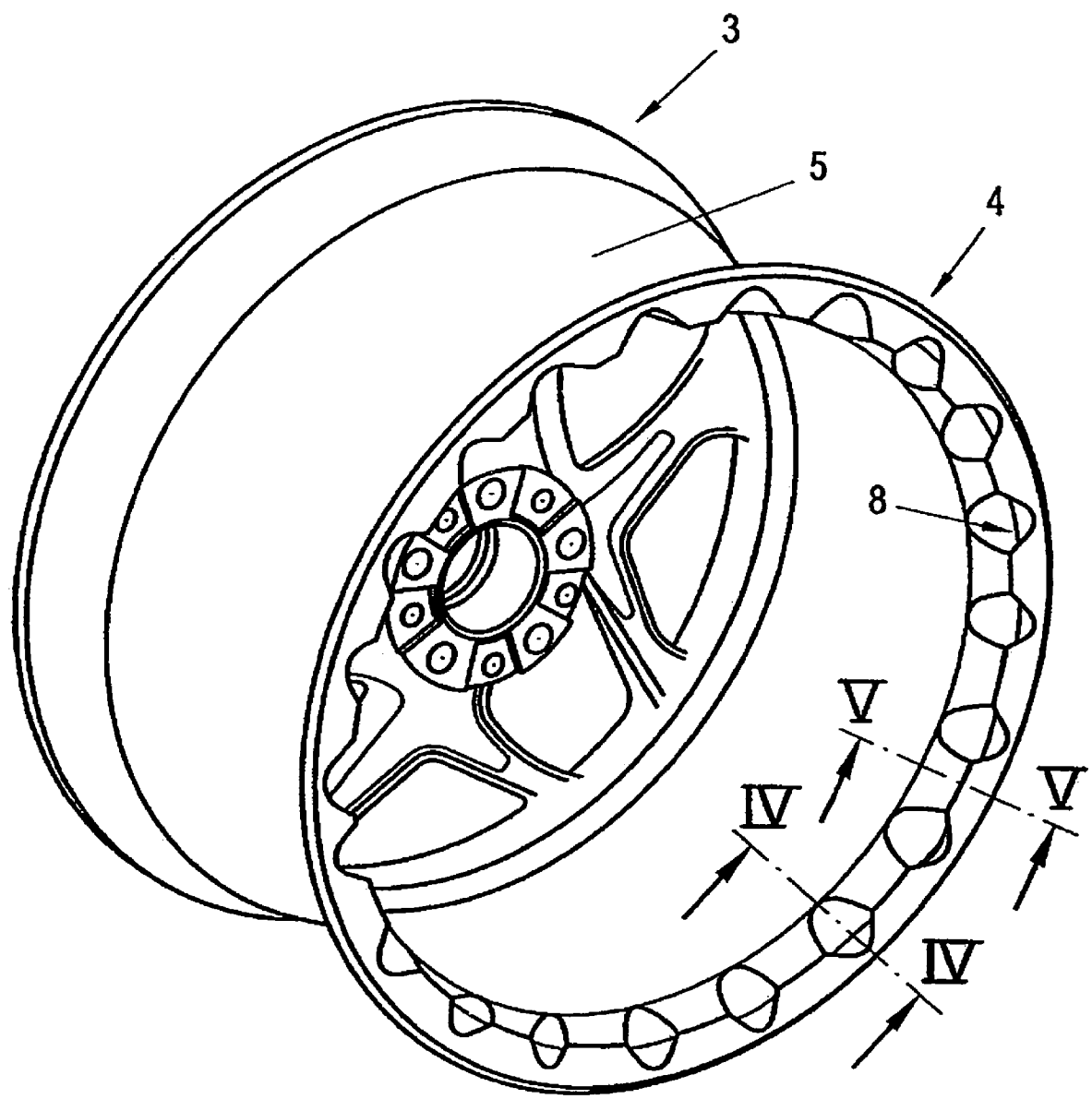
FIG. 2 shows a perspective view of the cast wheel according to FIG. 1.

In FIGS. 1 and 2, a cast wheel 1 made of a light metal alloy, in particular an aluminum alloy, is shown. The cast wheel 1 comprises a wheel rim body 2, which is followed by a front edge region 3. The front edge region 3 is connected to an oppositely located rear edge region 4 via a substantially cylindrical wheel rim base 5.

Figure 5:
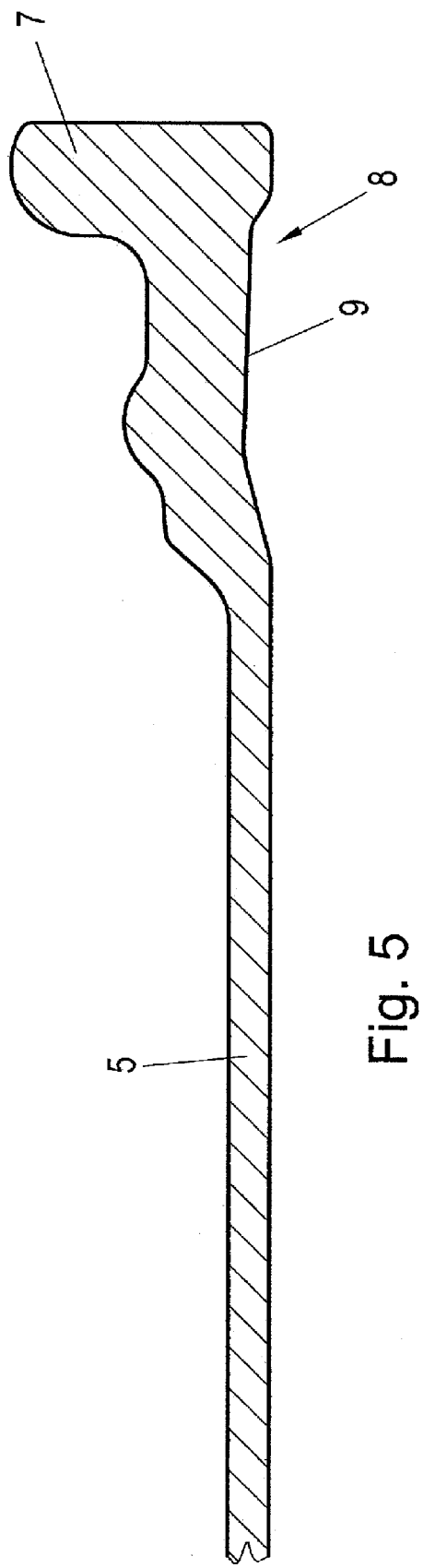
FIG. 5 shows a section according to line V-V of FIG. 2.

As is particularly visible in FIG. 5, the rear edge region 4 has a larger wall thickness than the wheel rim base 5 and, moreover, includes a rear-side peripherally extending bead 7, which substantially extends in the radial direction of the cast wheel.

Figure 3:
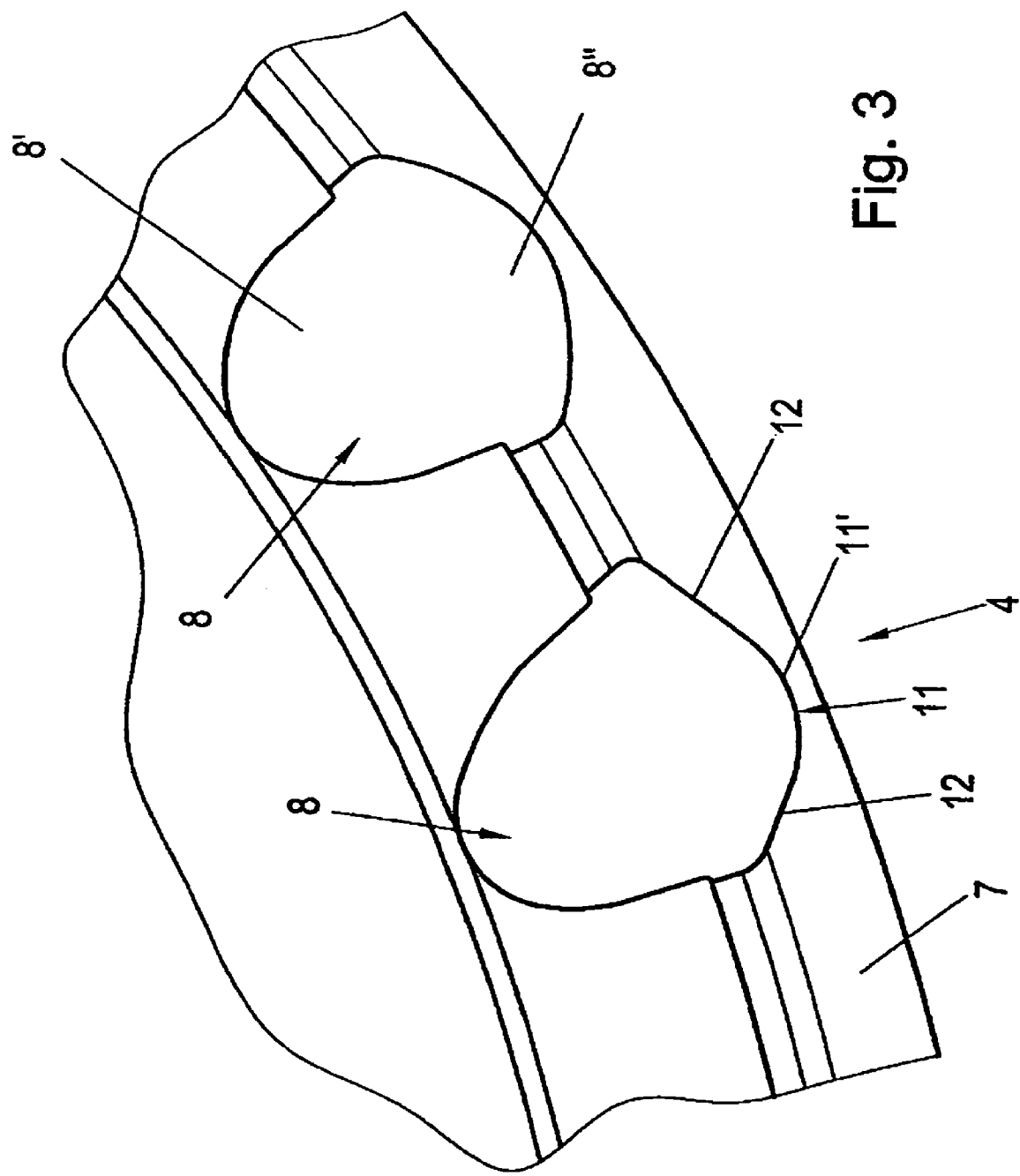
FIG. 3 in detail shows the reduced-material portions in the rear edge region of the cast wheel.

As can be seen in FIGS. 1 to 3, a plurality of reduced-material portions 8 is provided in the rear edge region 4 so as to reduce the weight of the cast wheel 1. In addition to the advantageous reduction in weight due to the reduced-material portions 8, the cast wheel 1 also has a slight stiffness resulting in a higher energy absorption capacity which enables an improved adaptation to the highly dynamic impact stress acting on a cast wheel.

Figure 4:
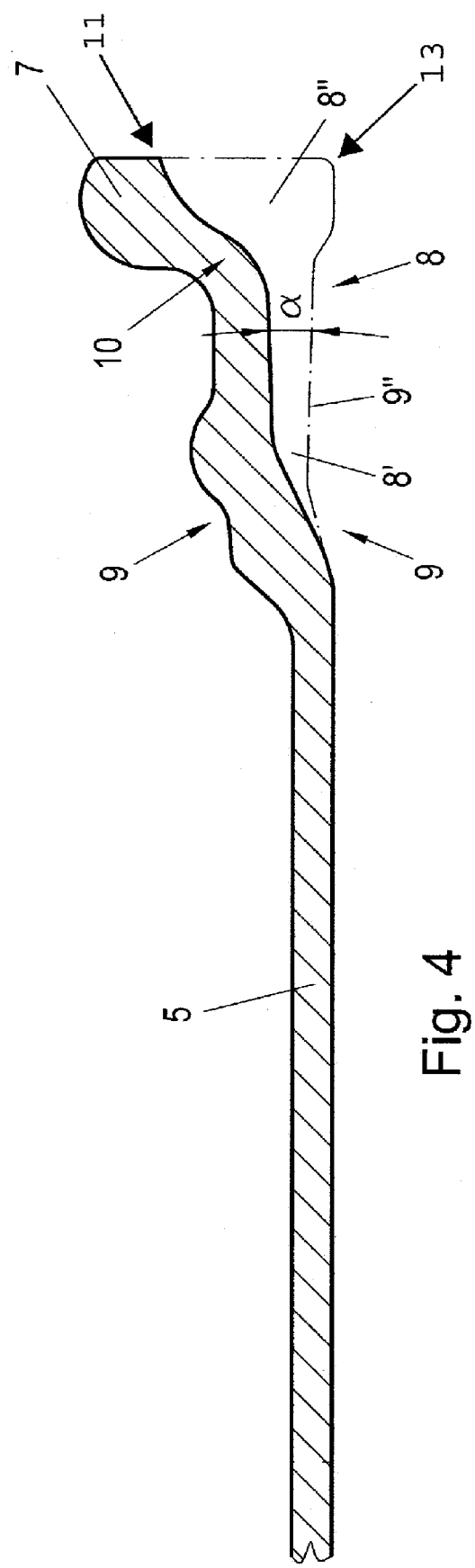
FIG. 4 shows a section according to line IV-IV of FIG. 2.

As can be particularly seen in FIGS. 3 and 4, the reduced-material portions 8 are provided on an inner side 9', which faces away from a side 9 for accommodating a tire. Here, the reduced-material portions 8 extend in a portion 8' substantially parallel with the plane of the wheel rim base's 5 longitudinal extension, and in a rear end portion 8'' substantially perpendicular to the former. This results in a substantial L-shape of the reduced-material portions 8, viewed in cross-section.

As is particularly visible in the sectional representation according to FIG. 4, the depth of the reduced-material portion 8 slightly increases at first on account of the concave curvature of the cast wheel 1. This is followed by a substantially straight-line portion which has an angle α of approximately 5° relative to an inner wall 9'' in the region without reduced-material portions. The step-shaped transition 10 to the rear end portion 8'' of the reduced-material portion 8 is convexly curved and a radius of approximately 8 mm is advantageously provided. The portion 8" in the region of the rear bead 7 is once again concavely curved and a radius of approximately 25 mm is advantageously provided.

As can be seen in particular in FIGS. 1 and 3, the portion 8"' of the reduced-material portion 8 located in the rear bead 7 extends radially inwards starting from a radially outwardly located vertex 11. Here, the vertex region I' is of circular design and advantageously has a radius of approximately 15 mm. The circular vertex portion 11' is followed by one portion 12 on each side that widens substantially along a straight line towards a leveling off end 13. The two straight lines enclose an opening angle of approximately 75°.

In FIGS. 6 and 7, a casting mold assembled of several parts is shown, in particular a mold lower part 15, a mold upper part 16 and a lateral mold part 17 are provided. As can be seen in particular in FIG. 6, the mold lower part 15 comprises material elevations 15' in portions and reduced-material portions 8 are formed in the finished cast wheel 1.

As is particularly visible in FIG. 7, material elevations 15' are provided only in certain sections of the mold lower part 15 such that in those regions where the elevations 15' are provided, the reduced-material portions 8 are produced according to the exemplary embodiment previously mentioned. However, no such reduced-material portions 8 are provided in the region shown in FIG. 7.

The reduced-material portions 8 may, of course, also have other shapes. However, it is advantageous that a reduction in the weight of the cast wheel 1 be achieved by the reduced-material portions 8 in the rear edge region 4, while at the same time, meeting the requirements with regard to the impact stress are met.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A cast wheel comprising:
  a wheel rim base, a rear edge region, and a front edge region, wherein the front edge region is coupled to the rear edge region via the wheel rim base;
  the rear edge region having a greater thickness than the wheel rim base;
  at least one reduced-material portion structured and arranged in the rear edge region;
  a circumferential bead arranged in a rearward portion of the rear edge region;
  the circumferential bead having a thickness that is greater than a second portion of the rear edge region, which axially inwardly adjoins the circumferential bead; and
  a vertex region being arranged in the circumferential bead, wherein the vertex region is arranged radially outwardly of the second portion of the rear edge region and the wheel rim base,
  a first portion of the at least one reduced-material portion is being defined by an inwardly curved edge in an area of an annular surface of the circumferential bead whose peak is defined by the vertex region,
  wherein the first portion widens radially inward from the vertex region towards a center axis of the cast wheel, and
  wherein the second portion of the at least one reduced-material portion is arranged adjacent to and axially inwardly of the first portion.

2. The cast wheel of claim 1, wherein a wall thickness of the cast wheel is structured to taper in a region of the at least one reduced-material portion relative to a peripherally adjacent portion.

3. The cast wheel of claim 2, wherein the at least one reduced-material portion comprises plural equally configured reduced-material portions.

4. The cast wheel of claim 1, wherein the at least one reduced-material portion is arranged on an inner side of the cast wheel, which faces away from a side for receiving a tire.

5. The cast wheel of claim 1, wherein the at least one reduced-material portion includes an extension that is substantially parallel to a plane of extension of the wheel rim base.

6. The cast wheel of claim 1, wherein the at least one reduced material portion includes an extension that is substantially parallel to a plane of extension of the rear edge region that forms the circumferential bead.

7. The cast wheel of claim 5, wherein the at least one reduced material portion is substantially L-shaped in cross-section.

8. The cast wheel of claim 1, wherein the at least one reduced material portion includes a depth that increases towards a rear end of the rear edge region.

9. The cast wheel of claim 8, wherein the depth of the at least one reduced material portion increases slightly starting from a region following the wheel rim base.

10. The cast wheel of claim 9, wherein a substantially step-shaped depression of the at least one reduced-material portion is provided in the region that forms the circumferential bead.

11. The cast wheel of claim 9, wherein the depth of the at least one reduced material portion increases substantially linearly.

12. The cast wheel of claim 9, wherein the at least one reduced material portion increases by approximately 5°.

13. The cast wheel of claim 1, wherein the cast wheel is concavely curved in the circumferential bead.

14. The cast wheel of claim 13, wherein the concavely curved portion is substantially circular-arc-shaped in cross-section.

15. The cast wheel of claim 13, wherein the concavely curved portion has a radius between 20 and 30 mm.

16. The cast wheel of claim 15, wherein the vertex region is circular-arc-shaped and has a radius between 10 and 20 mm.

17. A cast wheel comprising:
  a wheel rim base, a rear edge region, and a front edge region, wherein the front edge region is coupled to the rear edge region via the wheel rim base;
  at least one reduced-material portion structured and arranged in the rear edge region;
  a circumferential bead arranged in a rearward portion of the rear edge region;
  the circumferential bead having a thickness that is greater than a second portion of the rear edge region, which axially inwardly adjoins the circumferential bead; and
  a radially outwardly located vertex region being arranged in a region of the circumferential bead, wherein at least a part of the reduced-material portion is located in the region of the circumferential bead and is structured and arranged to widen radially inward from the radially outwardly located vertex region towards a center axis of the cast wheel, and wherein the wheel rim base is cylindrical and has an axial width that is greater than an axial width of the rear edge region, wherein a first portion of the at least one reduced-material portion is defined by an inwardly curved edge in an area of an inner circumferential surface and a second portion is defined by an inwardly curved edge in an area of a straight annular surface whose peak is defined by the radially outwardly located vertex region, wherein a thickness defined by a diameter of the peak and an outer circumference of the circumferential bead is less than a thickness defined by the diameter of the peak and the inner circumferential surface, and wherein a diameter of a rear tire bead receiving area is less than a diameter of the peak.

18. The cast wheel of claim 17, wherein the at least one reduced-material portion widens to enclose an angle between 70° and 80° along a straight line in the radially outwardly vertex region.

19. The cast wheel of claim 18, wherein the angle is substantially 75°.

20. A casting mold for producing the cast wheel of claim 1 comprising:
at least one elevation of material in a rear edge region of the cast wheel, wherein a wall thickness of the cast wheel tapers into the at least one elevation of material relative to a peripherally adjacent region.

21. A cast wheel comprising:
a wheel rim base arranged between a front edge region and a rear edge region having a circumferential bead;
a rear tire bead receiving area arranged in the rear edge region between the circumferential bead and a circumferential projection arranged between the wheel rim base and the circumferential bead;
a diameter of the rear tire bead receiving area being less than a diameter of the circumferential projection;
plural spaced apart reduced-material portions each arranged in the rear edge region;
each reduced-material portion having a first portion that is arranged on an inner circumferential surface underneath the tire bead receiving area and between an end of the wheel rim base and a straight annular surface of the rear end region and a second portion extending to the straight annular surface and arranged underneath the circumferential bead;
a vertex region being located where the second portion meets the straight annular surface of each reduced-material portion;
a diameter of an imaginary circle defined by the vertex regions being greater than the rear tire bead receiving area;
each of the first and second portions being inwardly curved, having a changing diameter between the wheel based and the straight annular surface, and being connected by a step-shaped transition,
wherein one of:
a diameter of each reduced-material portion increases between the wheel rim base and the straight annular surface and an axial width of the wheel rim base is greater than an axial width of each reduced-material portion; and
a diameter of each reduced-material portion increases in the first portion between the wheel rim base and the straight annular surface and increases in the second portion by a greater amount between the first portion and the straight annular surface and an axial width of the wheel rim base is greater than an axial width of each reduced-material portion.

22. The cast wheel of claim 1, wherein the at least one reduced-material portion comprises plural reduced material portions and wherein a diameter of an imaginary circle defined by the vertex regions is greater than a diameter of a rear tire bead receiving area.

23. The cast wheel of claim 17, wherein the at least one reduced-material portion comprises plural reduced material portions and wherein a diameter of an imaginary circle defined by the vertex regions is greater than the diameter of the rear tire bead receiving area.

* * * * *